(12) United States Patent
Ward et al.

(10) Patent No.: US 12,134,288 B2
(45) Date of Patent: Nov. 5, 2024

(54) SAFETY CHAIN TIE DOWN MECHANISM WITH T-PIN

(71) Applicant: HORIZON GLOBAL AMERICAS INC., Plymouth, MI (US)

(72) Inventors: Brian Wayne Ward, Swartz Creek, MI (US); Curt Nowak, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 732 days.

(21) Appl. No.: 17/286,012

(22) PCT Filed: Oct. 16, 2019

(86) PCT No.: PCT/US2019/056535
§ 371 (c)(1),
(2) Date: Apr. 16, 2021

(87) PCT Pub. No.: WO2020/081681
PCT Pub. Date: Apr. 23, 2020

(65) Prior Publication Data
US 2021/0387492 A1    Dec. 16, 2021

Related U.S. Application Data

(60) Provisional application No. 62/746,063, filed on Oct. 16, 2018.

(51) Int. Cl.
*B60D 1/06*    (2006.01)
*B60D 1/18*    (2006.01)
*B60D 1/48*    (2006.01)
*B60D 1/58*    (2006.01)

(52) U.S. Cl.
CPC ............ *B60D 1/488* (2013.01); *B60D 1/187* (2013.01); *B60D 1/583* (2013.01); *B60D 1/06* (2013.01)

(58) Field of Classification Search
CPC ........ B60D 1/488; B60D 1/187; B60D 1/583; B60D 1/06
See application file for complete search history.

(56) References Cited

U.S. PATENT DOCUMENTS

| | | | |
|---|---|---|---|
| 5,738,471 A | 4/1998 | Zentner et al. | |
| 10,766,320 B2* | 9/2020 | McCall | B60D 1/583 |
| 10,994,793 B2* | 5/2021 | Ward | B62D 53/0807 |
| 11,440,599 B2* | 9/2022 | Scruggs | B62D 53/0842 |
| 2015/0224836 A1 | 8/2015 | Stanifer et al. | |

(Continued)

OTHER PUBLICATIONS

International Search Report and Written Opinion mailed Jan. 13, 2020; International Patent Application No. PCT/US2019/056535 filed on Oct. 16, 2019. ISA/US.

*Primary Examiner* — Kevin Hurley
*Assistant Examiner* — Marlon A Arce

(57) ABSTRACT

A safety chain tie down assembly is shown and described. The safety chain tie down assembly may comprise a body member, a pin member, and a securing member. The pin member may include a plunging portion configured to engage with a receiver of an under bed hitch mounting device. The pivot motion of the plunging portion may position the pin member between an unlocked position and a locked position. The safety chain tie down assembly may include a securing member that includes a lever, in which actuation of the lever positions the securing member into a secured configuration.

19 Claims, 8 Drawing Sheets

(56) References Cited

U.S. PATENT DOCUMENTS

2017/0072754 A1 3/2017 McCoy
2017/0151844 A1* 6/2017 Stanifer ................ B60D 1/182
2017/0327161 A1 11/2017 Ward

* cited by examiner

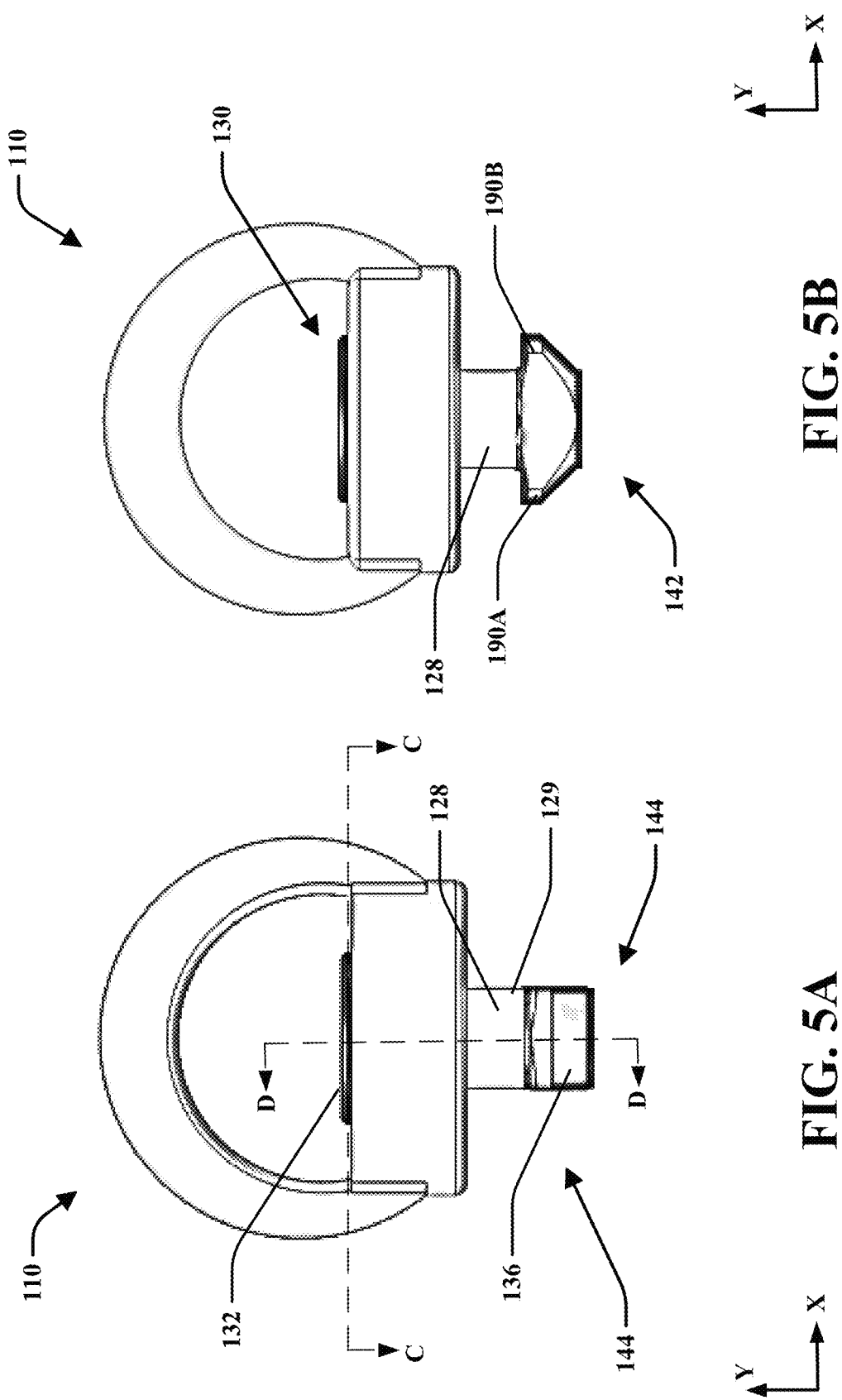

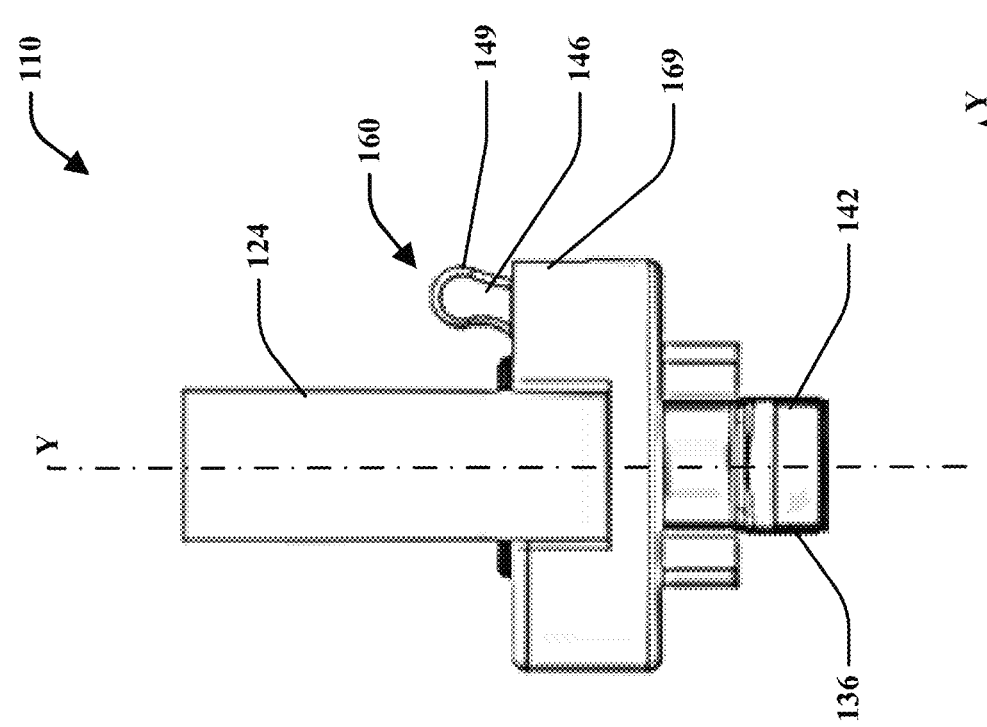
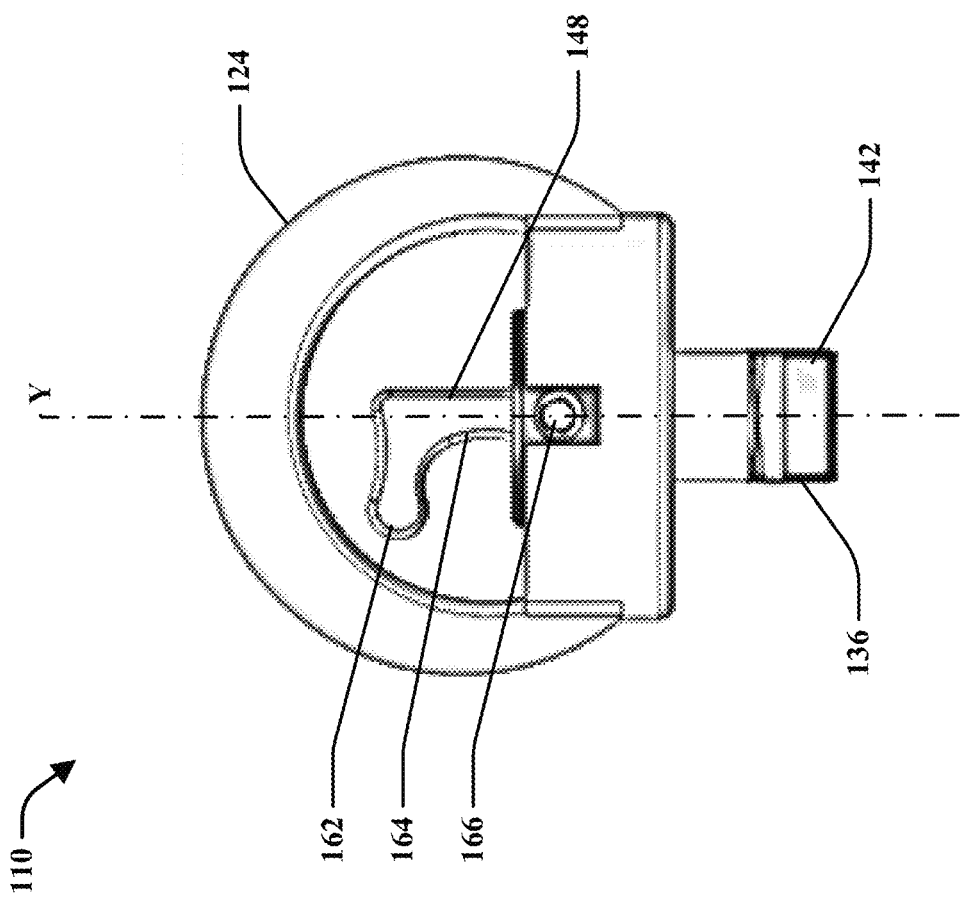
FIG. 7A
FIG. 7B

US 12,134,288 B2

SAFETY CHAIN TIE DOWN MECHANISM WITH T-PIN

CROSS-REFERENCE TO RELATED APPLICATIONS

This application is a 35 U.S.C. 371 national stage filing of PCT Application No. PCT/US2019/056535 filed on Oct. 16, 2019, and entitled "SAFETY CHAIN TIE DOWN MECHANISM WITH T-PIN," which claims priority to Provisional Patent Application No. 62/746,063 entitled "SAFETY CHAIN TIE DOWN MECHANISM WITH T-PIN" filed on Oct. 16, 2018 each of which are hereby incorporated by reference in their entireties.

FIELD OF INVENTION

The present invention generally relates to a tie down mechanism used in towing and more particularly to a removable tie down mechanism for securing safety chains of a device being towed.

BACKGROUND

It is well known in the art to utilize a trailer hitch to connect a trailer to a towing vehicle. There are many different types of trailer hitches known in the art that are attached to the towing vehicle in a variety of ways, depending on the type of hitch. Some of the most common types of hitches include gooseneck, fifth wheel, front mount, and the like. Typically, trailers are connected to a towing vehicle by way of a ball hitch secured to the vehicle and a ball socket coupling mechanism on the trailer that mounts over the ball and thereby allows the trailer to pivot behind the towing vehicle.

The ball hitch of some hitches, such as gooseneck, are commonly mounted in the bed of a pickup truck near the longitudinal centerline of the bed. This allows the weight of the trailer to be evenly distributed between the tires on the two sides of the towing vehicle. This type of hitch is often secured to the truck structure in an opening cut in the bed of the truck so that a substantial portion of the hitch attachment is located below the bed of the truck. In addition, the ball typically may be removed or lowered to a stowed position below the bed to ensure that the use of the bed is not substantially hindered by the presence of the ball.

Consumers often utilize additional trailer hitch accessories with their trailers. These accessories are products that mount or secure to the trailer, such as safety chains, couplers, coupler locks, jacks, trailer lights, bearing protectors, winches and hitch balls. Safety chains are often used in conjunction with a gooseneck hitch when towing a trailer. Safety chains are an added safety measure that are generally used to provide a secondary means of connection between the rear of the towing vehicle and the front of the trailer or towed vehicle in case of separation. If the safety chain is to be of value, assurance must be had that the safety chain will stay connected to the link if the hitch fails. The consumer should also make sure that the safety chains are never dragging on the road when hooked up. Safety chains come in a variety of different sizes and strengths.

Safety chains may be secured between the trailer and an anchor within the truck, preferably associated with the hitch to prevent the trailer from breaking away from the pickup truck in the event that the hitch uncouples from the hitch ball. The securing chains may be secured between the trailer and an anchor within the towing vehicle. The attachment assemblies for the securing chains often prevent or otherwise inhibit full use of the load bed of the towing vehicle. Further, the securing chains may cause the securing chain attachment assemblies to which the securing chain attaches to have significant forces applied during operation. These forces may be applied in multiple directions depending on several operational factors.

Therefore, there is a need to provide a removable securing chain attachment assembly that may resolve any of the foregoing issues identified. Further, there is a need for a tie-down mechanism that is easy to use and is able to withstand the multitude of forces applied thereto during operation. Still further, there is a need for features that may help prevent the tie-down mechanism from unintentionally coming out of such attachment during use.

SUMMARY OF THE PRESENT INVENTION

Provided is a safety chain tie down assembly, comprising a body member including a body and a handle. A pin member may be engagable with the body member, the pin member including a plunging portion configured to engage with a receiver of an under bed hitch mounting device. Pivot motion of the plunging portion may position the pin member between an unlocked position and a locked position. A securing member including a lever may be attached to the pin member wherein actuation of the securing member positions the lever into engagement with the body member in a secured configuration. The body member may include an anti-rotation member extending from the body member. The securing member may include a linkage member attached to the lever. The body member may include a receiving portion positioned within the body, wherein the receiving portion includes a perimeter wall and a bottom floor. A body opening may be positioned along the bottom floor wherein the body opening has a complimentary shape to the shape of the plunging portion of the pin member. The perimeter wall and bottom floor may have a generally complementary shape to a shape of a top portion of the pin member such that the body member is configured to receive the top portion of the pin member and the top portion is rotatable relative to the body of the body member. The perimeter wall may include a generally circular configuration to allow a perimeter wall of the top portion of the pin member to rotate when received within the receiving portion of the body. The top portion of the pin member may include a bottom surface configured to abut against the bottom floor of the body member to allow the pin member to be received and rotate within the body member.

In another embodiment, provided is a safety chain tie down assembly, comprising a body member including a body, a handle shaped to define a chain receiving space with the body and an anti-rotation member extending from the body opposite from the handle. A pin member may be engagable with the body member, the pin member including a top portion, an elongated portion and a plunging portion wherein the plunging portion may be configured to engage with a receiver of an under bed hitch mounting device. The plunging portion may be configured to pivot relative to the body member to position the pin member between an unlocked position and a locked position. A securing member including a lever may be attached to the pin member wherein actuation of the securing member positions the lever into engagement with the body member in a secured configuration. The securing member further comprises a linkage member attached to the lever. The body member may further comprise a receiving portion positioned within the body, wherein the receiving portion includes a perimeter wall and a bottom floor. A body opening may be positioned along the bottom floor wherein the body opening has a complimentary shape to the shape of the plunging portion of the pin member. The perimeter wall and bottom floor may have a generally complementarily shape to a shape of the top portion of the pin member such that the body member is configured to receive the top portion of the pin member and the top portion is rotatable relative to the body of the body member. The perimeter wall may include a generally circular configuration to allow a perimeter wall of the top portion of the pin member to rotate when received within the receiving portion of the body. The top portion of the pin member may include a bottom surface configured to abut against the bottom floor of the body member to allow the pin member to be received and rotate within the body member.

In an embodiment, provided is a safety chain tie down assembly, comprising a body member including a body, a handle shaped to define a chain receiving space with the body and an anti-rotation member extending from the body opposite from the handle. A receiving portion may be positioned within the body, wherein the receiving portion includes a perimeter wall and a bottom floor. A body opening may be positioned along the bottom floor. A pin member may be engagable with the body member, the pin member including a top portion, an elongated portion and a plunging portion wherein the plunging portion is configured to engage with a receiver of an under bed hitch mounting device. The body opening may have a complimentary shape to the shape of a plunging portion of the pin member. The plunging portion may be configured to pivot relative to the body member to position the pin member between an unlocked position and a locked position. A securing member including a lever may be attached to the pin member wherein actuation of the securing member positions the lever into engagement with the body member in a secured configuration. The securing member may include a linkage member attached to the lever. The securing lever may include a lever handle and a lever body laterally disposed from the lever handle, wherein the securing lever may be attached to the top portion of the pin member by a linkage member located at the top body portion of the body member. The body member may include an engaging portion such that the securing lever is configured to be biased to engage the engaging portion in an engaged position to prevent rotation of the pin member relative to the body member and to disengage the securing lever from the engaged portion in a disengaged positon to allow rotation of the pin member relative to the body member.

BRIEF DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings:

FIG. 5A is a side view of the safety chain tie down assembly of FIG. 3 in an unlocked position;

FIG. 5B is a side view of the safety chain tie down assembly of FIG. 3 in a locked position;

FIG. 7A is a side view of the safety chain tie down assembly of FIG. 6 in a locked position; and FIG. 7B is a side view of the safety chain tie down assembly of FIG. 6 with the securing lever in a secured configuration.

DETAILED DESCRIPTION

Figure 1A:
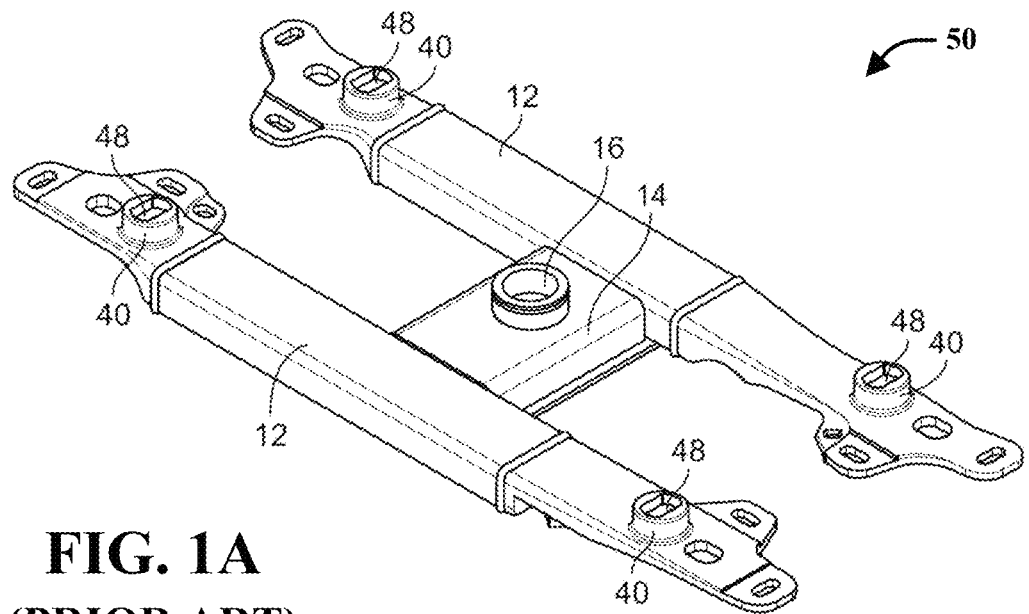
FIG. 1A is a perspective view of a prior art hitch mounting system without a safety chain tie down mechanism.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

Figure 1B:
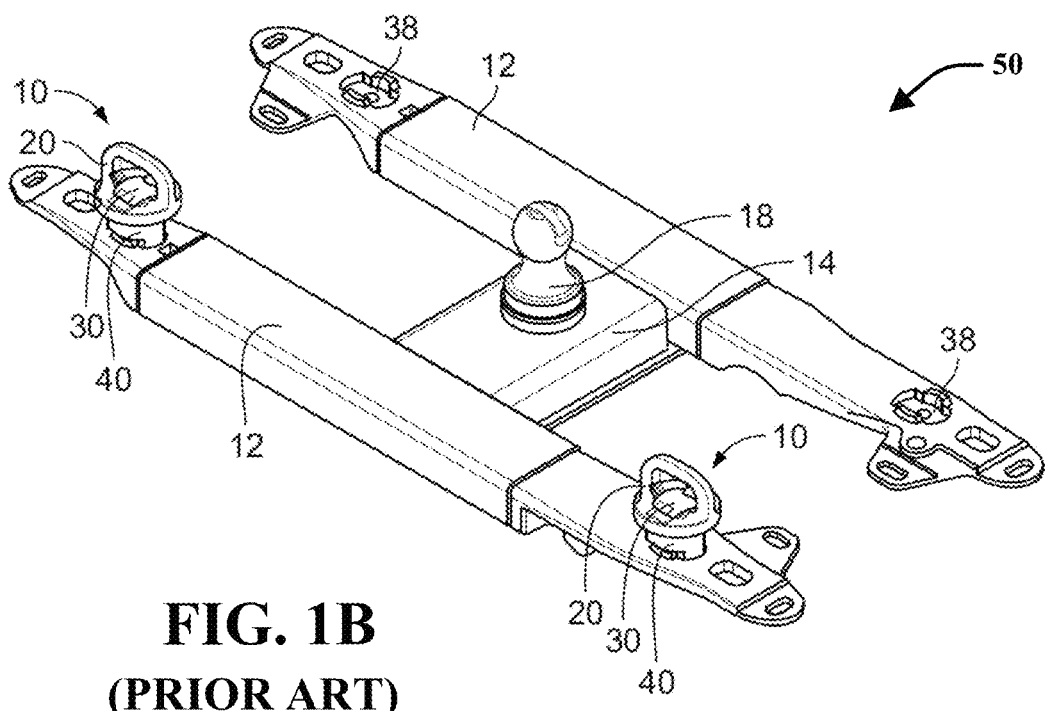
FIG. 1B is a perspective view of a prior art hitch mounting system illustrated with safety chain tie down mechanism.

Trailer hitches, such as a gooseneck or fifth wheel hitch may be mounted to a truck bed. FIGS. 1A and 1B are prior art attachment assemblies for a towing vehicle. These types of hitches are often mounted beneath the truck bed in conjunction with the truck's own frame rails, such as with cross members or rails 12 for example. In addition, these cross members 12, also known as pucks, may be mounted to the truck bed with the use of the receiver 40.

FIGS. 1A and 1B depict an exemplary vehicle mounting system 50. The vehicle mounting system 50 may include at least two rails or cross members 12. The cross members 12 may include sockets 38 for attachment with receiver 40. Each receiver 40 may be mounted in a socket 38 provided in either of the cross members 12. The receivers 40 may be secured in the socket 38 by any appropriate means, such as with fasteners, welding or the like. For example, a fastener, such as a bolt, could pass through an aperture in the bottom wall of the cross member 12 and be secured in place by a cooperating nut and lock washer (not shown) if desired. The safety chain tie down apparatus 10 may take advantage of an under bed mounting system designed for the various types of hitches. These types of hitches may mount on top of an under bed rail mounting system where the hitch ball may either be removed or folded down for easy access. For example, the safety chain apparatus 10 may allow users that have an existing rail kit to use the receivers 40 for safety chain hook ups on gooseneck trailers.

Figure 2:
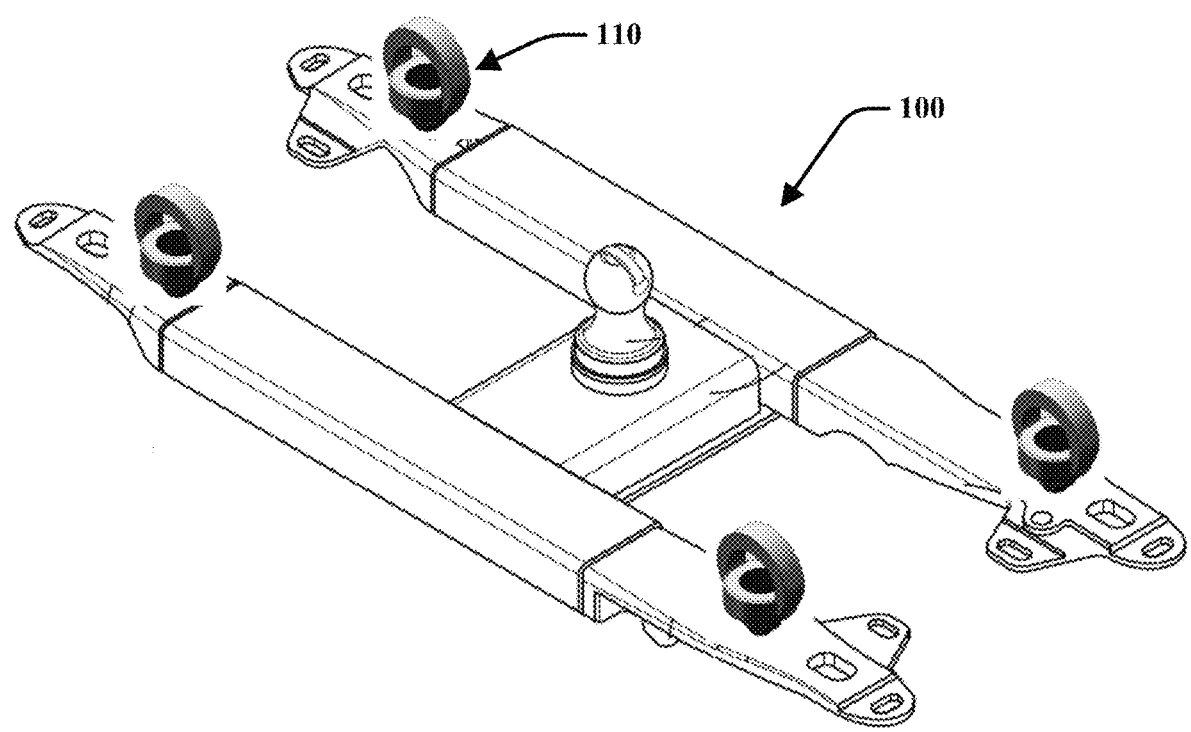
FIG. 2 is a perspective view of an embodiment of a hitch mounting system and safety chain tie down assembly of the instant application.

FIG. 2 is a perspective view of the removable securing chain attachment assembly 100 that includes a safety chain tie down member 110 of the instant application that is not known or taught by the prior art. The removable securing chain attachment assembly 100 may comprise any number of safety chain tie down members 110, including, without limitation, a pair of safety chain tie down apparatus 110 as shown in FIG. 2. However, the present teachings contemplate any appropriate number of safety chain tie down members 110, including, without limitation, one, two, three, four, etc. The safety chain tie down member 110 may be selectively and operatively positioned in the receivers 40 that are positioned rear most to the direction of travel of the towing vehicle, e.g., the two receiving members 40 that are positioned adjacent to the tailgate of a pickup truck.

Figure 3:
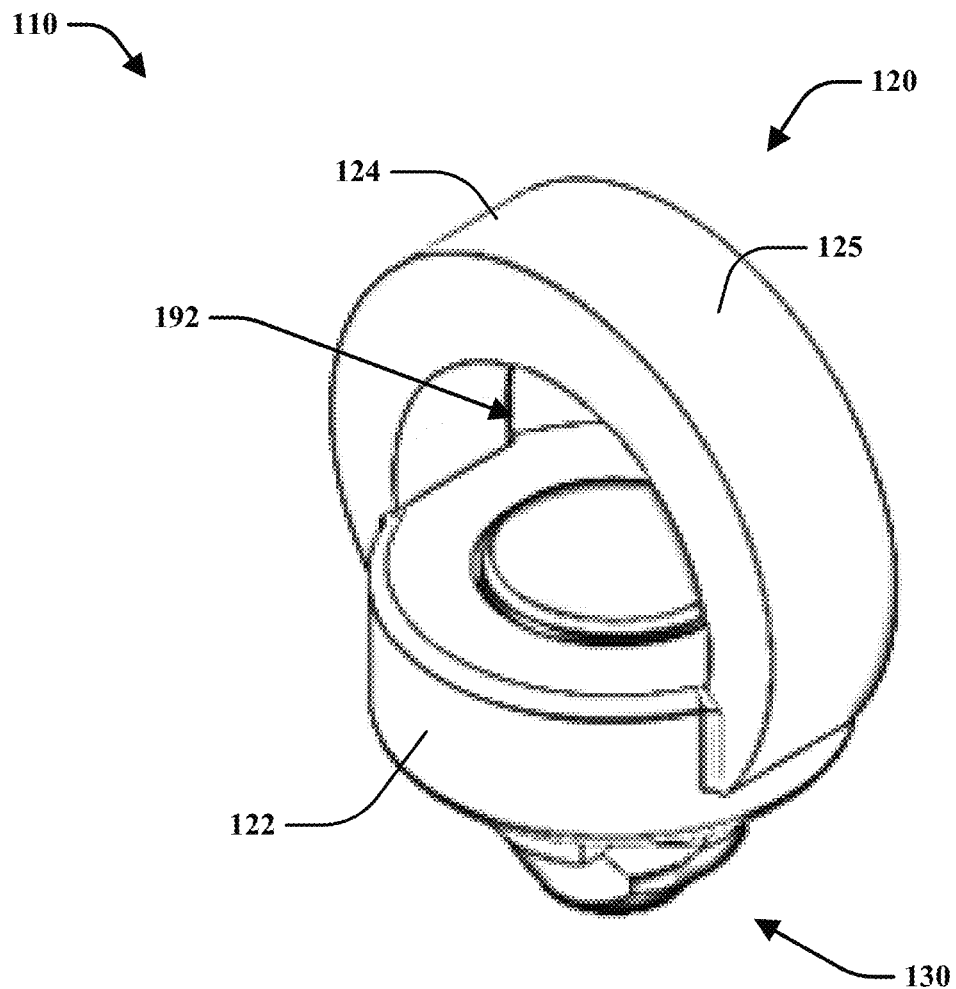
FIG. 3 is a perspective view of an embodiment of the safety chain tie down assembly of the instant application.
Figure 3:
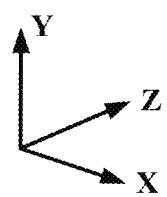

An exemplary embodiment of the safety chain tie down member 110 is illustrated in FIG. 3. The safety chain tie down member 110 may improve securing the trailer to a towing vehicle utilizing a safety chain. The safety chain tie down member 110 may include a body member 120 and a pin member 130. The safety chain tie down member 110 may provide a practical safety chain tie down apparatus that may be associated with and attached to a trailer mounting system where the safety chain tie down member 110 may be adapted to reliably and securely engage the links of a safety chain (not shown).

The safety chain tie down member 110 may be constructed to securely and removably anchor down the safety chain that may be in use with a towed vehicle. The safety chain tie down member 110 may be of any number of appropriate shapes or sizes in addition to those shown in the figures and may have a streamlined design and appearance that may be aesthetically pleasing. The safety chain tie down member 110 may be used with any appropriate trailer hitch mounting kit, such as those that utilize rail mounts or cross members 12 for example, such as with the "Signature Series" produced and sold by Horizon Global.

The body member 120 may include a body 122, a handle 124, and a body opening 126. The body 122 may be of any suitable shape or size, such as a generally cylindrical shape. The body 122 may be constructed from a variety of appropriate materials, such as of a durable plastic material or a strong metallic material. By way of a non-limiting example, the body 122 may be formed from steel. The body member 120 may be a one-piece integrally formed member, e.g., it may be monolithically formed. In the alternative, the body member 120 may be formed from components attached together such as through welding or the like.

The handle 124 may extend outwardly from one side of the body 122 or both sides thereof. The handle 124 may be of any appropriate shape or size. In the particular embodiment shown in FIG. 3, the handle 124 may be arcuate. The handle 124 may also be of a contoured shape for ease and comfort of use. While the handle 124 is shown as extending from two sides of the body 122, it is to be understood that the handle 124 may only be attached to the body 122 on one side (such as a generally L-shaped handle) or may be attached on any desired number of sides, such as three or four, and the like. In addition, the handle 124 may be integrally formed with the body 122 or may be a separate piece from the body 122, which may require attachment by any appropriate means, such as with fasteners, welding, or the like. Further, the handle 124 may be selectively attached with the body 122 such that the handle 124 or a portion thereof may be positioned to allow the safety chain to be inserted or otherwise engaged with the handle 124. The handle 124 may define an opening 192 with the body 122 that is configured to receive and secure a safety chain therethrough.

In some embodiments, the handle 124 may further include a grip 125. The grip 125 may be a sleeve selectively engageable with the handle 124. The grip 125 may be a knurled pattern disposed on the handle 124. Alternatively, the grip 125 may be of any configuration that assists the user to grasp the handle 124. By way of a non-limiting example, the grip 125 may include bumps, grooves, slots, raised surfaces or depressed surfaces that assist the user in gripping the handle 124. Further, the grip 125 may be of any appropriate shape or size, such as having a generally tubular, square, rectangular, or like shape. The grip 125 may be manufactured of any appropriate material such as an elastomeric material or a combination of elastomeric material and metal or a hard rubber or plastic. The grip 125 may be formed to allow for an ergonomic grip by a user's hand.

Figure 4B:
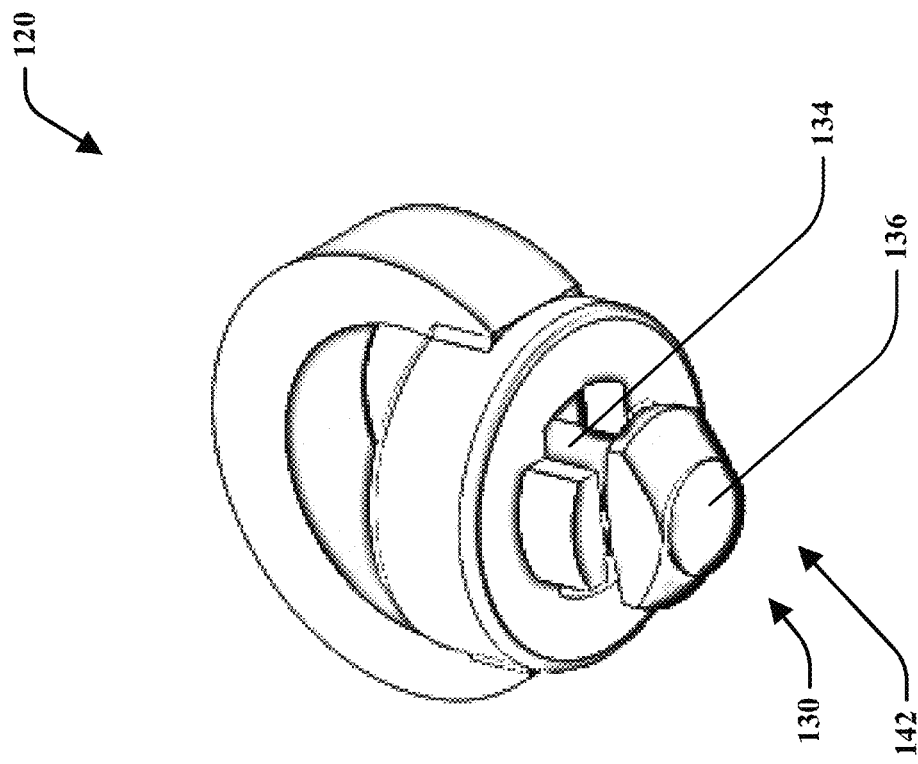
FIG. 4B is a perspective view of the safety chain tie down assembly of FIG. 3 in a locked position.
Figure 4A:
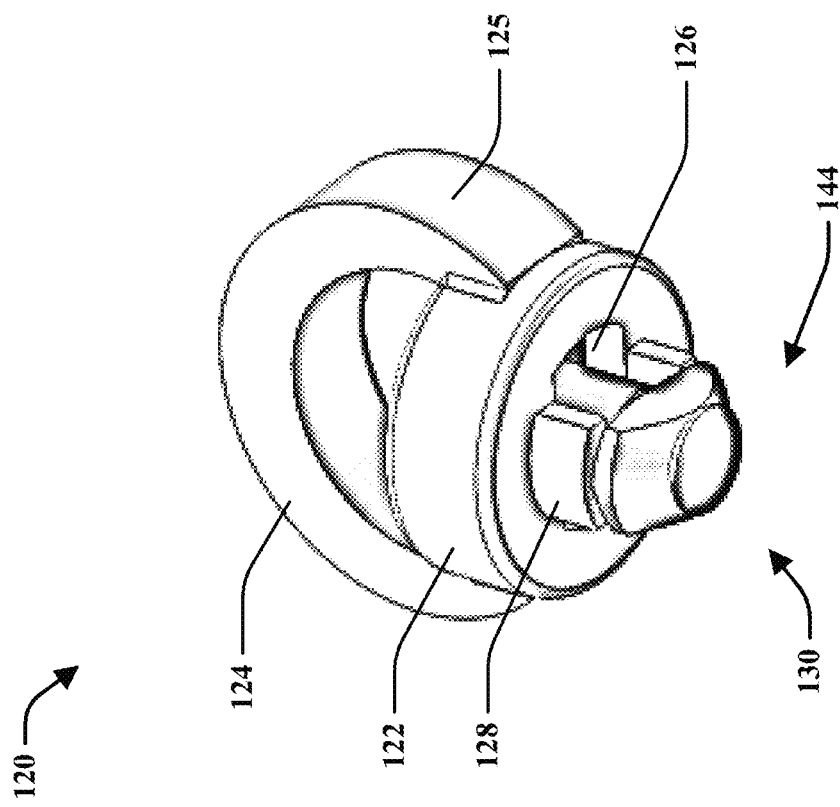
FIG. 4A is a perspective view of the safety chain tie down assembly of FIG. 3 in an unlocked position.

Referring to FIGS. 4A and 4B, the body opening 126 may be positioned at any appropriate location within the body member 120. The body opening 126 may be in a telescoping and rotatable relationship with or otherwise telescopingly and rotatably engaged with the pin member 130. The body opening 126 may be of any appropriate shape or size.

Further, the body member 120 may include an anti-rotation member 128 that may generally prevent the body member 120 from rotating such as when selectively engaged with a receivers 40. The pin member 130, however, may still rotate relative to the body member 120. By way of a non-limiting example, the anti-rotation member 128 may extend downwardly from the body 122 to engage receiving portion (not shown) preventing the body member 120 from rotating. The anti-rotation member 128 may engage any appropriate portion of the receivers 40. The anti-rotation member 128 may be attached with a biasing member (not shown).

Referring to FIGS. 5A and 5B, the pin member 130 may include a top portion 132, an elongated portion 134, and a plunging portion 136. The elongated portion 134 may extend downwardly from the top portion 132, such as perpendicularly away. The elongated portion 134 may be of any appropriate shape or size, such as a generally cylindrical shape. The elongated portion 134 and the plunging portion 136 may be of a shape and size that is configured to be insertable within and through the body opening 126 of the body member 120. The fit between the elongated portion 134 and body opening 126 is generally tight such that the body opening 126 is just large enough to allow the elongated portion 134 and the plunging portion 136 to pass therethrough without additional space therebetween. This may reduce rattling between the components.

Figure 5D:
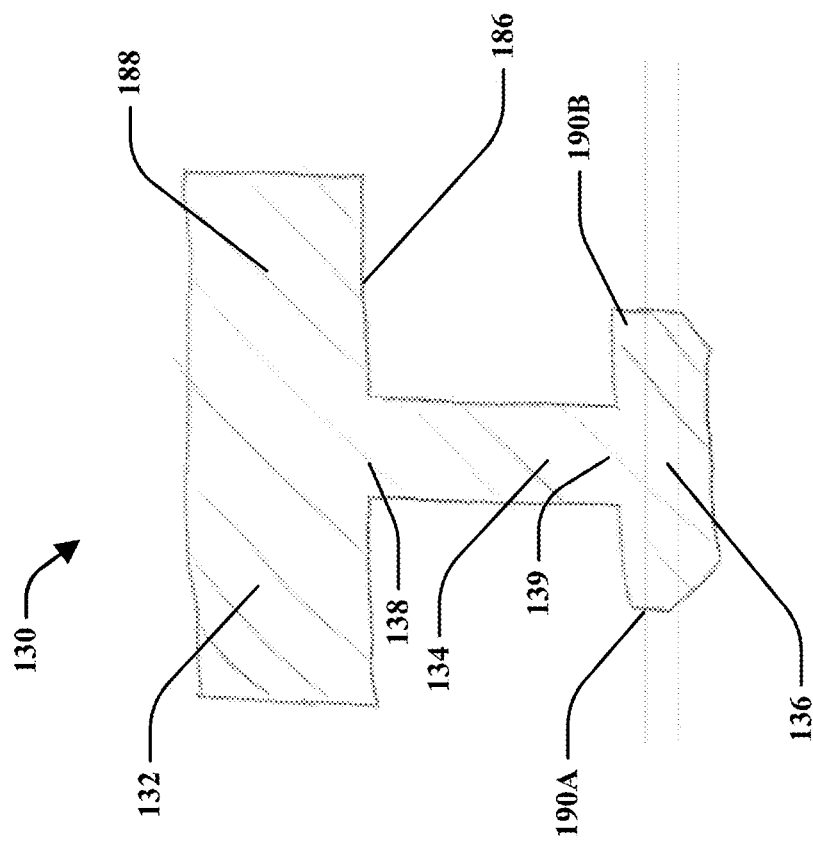
FIG. 5D is a cross sectional view of the pin member of FIG. 5A taken along line D-D.
Figure 5C:
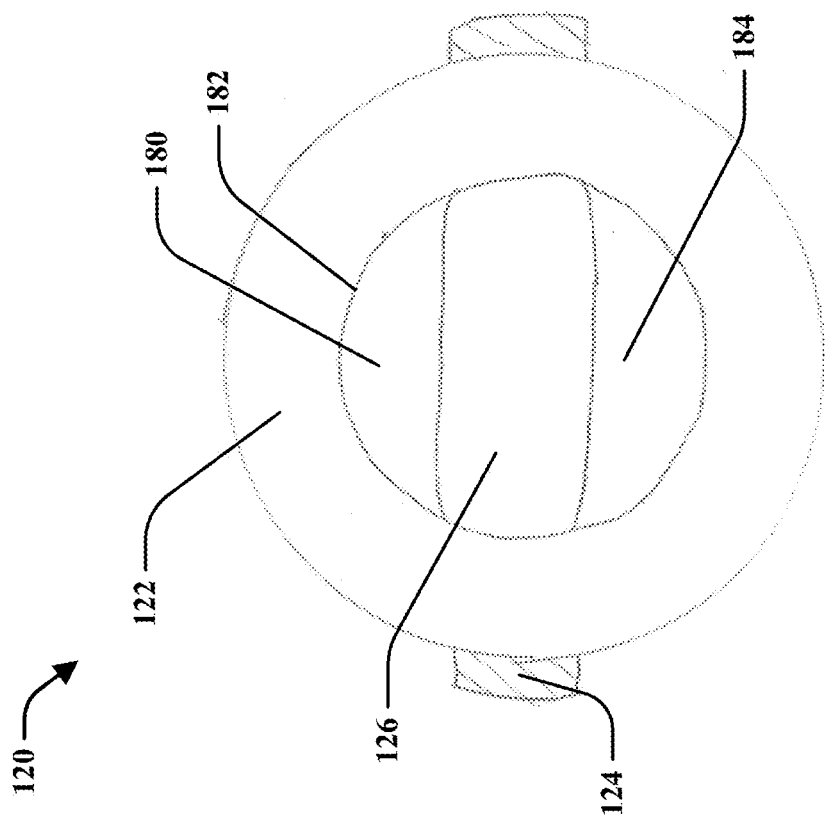
FIG. 5C is a cross sectional view of the body member of FIG. 5A taken along line C-C.

FIG. 5A illustrates lines C-C and D-D that illustrate cross sectional locations of FIGS. 5C and 5D, respectively. FIG. 5C illustrates the body member 120 separate from the pin member 130 along line C-C. FIG. 5D illustrates the pin member 130 along line D-D separate from the body member 120. These figures identify how the pin member 130 and the body member 120 may be shaped to interact with one another in a translatable and rotatable configuration to allow for the safety chain tie down member 110 to be attachable to a receiver 40 and to properly receive and support a safety chain during use. In an embodiment, the body member 120 includes a receiving portion 180 positioned within the body 122. The receiving portion 180 may have a generally complementary shape to the shape of the top portion 132 of the pin member 130 and be configured to receive the top portion 132 therein. The receiving portion 180 may be defined by a perimeter wall 182 and a bottom floor 184. Notably, the perimeter wall 182 may have a generally circular configuration to allow the complementary shaped top portion 132 of the pin member 130 to rotate relative to the other. Additionally, the body opening 126 may be located within the bottom floor 184. Notably, the body opening 126 may have a generally complementary shape and allow the plunging portion 136 to be received therein. The body opening 126 may have a generally complementary shape to the plunging portion 136 such that as the pin member 130 rotates relative to the body member 120, the plunging portion 136 retains the pin member 130 relative to the body member 120 and also the receiver 40. A bottom surface 186 of the top portion 134 may abut against the bottom floor 184 of the body member 120 to allow the pin member 130 to be received and rotatably retained within the body member 120.

In an embodiment, the top portion 132 of the pin member 130 may include a perimeter wall 188 that may be complementary shaped relative to the perimeter wall 182 of the receiving portion 180 of the body member 120. The perimeter walls 182, 188 may have various types of surface interfaces to allow for the structural and functional use of the safety change tie down member 110. The perimeter walls 182, 188 may include a generally threaded surface interface, annular recesses for receiving ball bearings (not shown) therebetween, a gasket interface, or other types of fasteners and surface to allow for the complementary rotation of the top portion 132 of the pin member 130 relative to the body 122 of the body member 120

The elongated portion 134 may include a top end 138 and a bottom end 139. The bottom end 139 may be connected to the plunging portion 136 in any appropriate manner. The pin member 130 may be a one-piece integrally formed member or may be attached such as through a subsequent operation. The plunging portion 136 may be located outside the body opening 126 of the body 122. The plunging portion 136 may be of any appropriate shape or size. By way of a non-limiting example, the plunging portion 136 may be a male locking portion configured to engage a corresponding female locking member of the receiving members 40, described in more detail below.

The plunging portion 136 may allow the pin member 130 to be selectively and operatively engaged with receiving members 40 between a locked position 142 and an unlocked position 144. The plunging portion 136 may include a first locking member 190A and a second locking member 190B. The first locking member 190A may extend opposite from the second locking member 190B wherein each defines an elongated body shaped to fit within the receiver 40 and be rotated up to about 90 degrees to be placed in the locked positon 142. In the locked position 142, the plunging portion 136 may rotate the locking members 190A, 190B to extend outwardly beyond the perimeter of the body opening 126 and internal surfaces of the receiver 40. The locking members 190A, 190B may engage, for example, the receiving member 40 to generally prevent the safety chain tie down member 110 from being removed from the receiving member 40. Such a configuration may ensure that the safety chain tie down member 110 may remain in the locked position to generally prevent disconnection from the receiving member 40 while towing.

Figure 6:
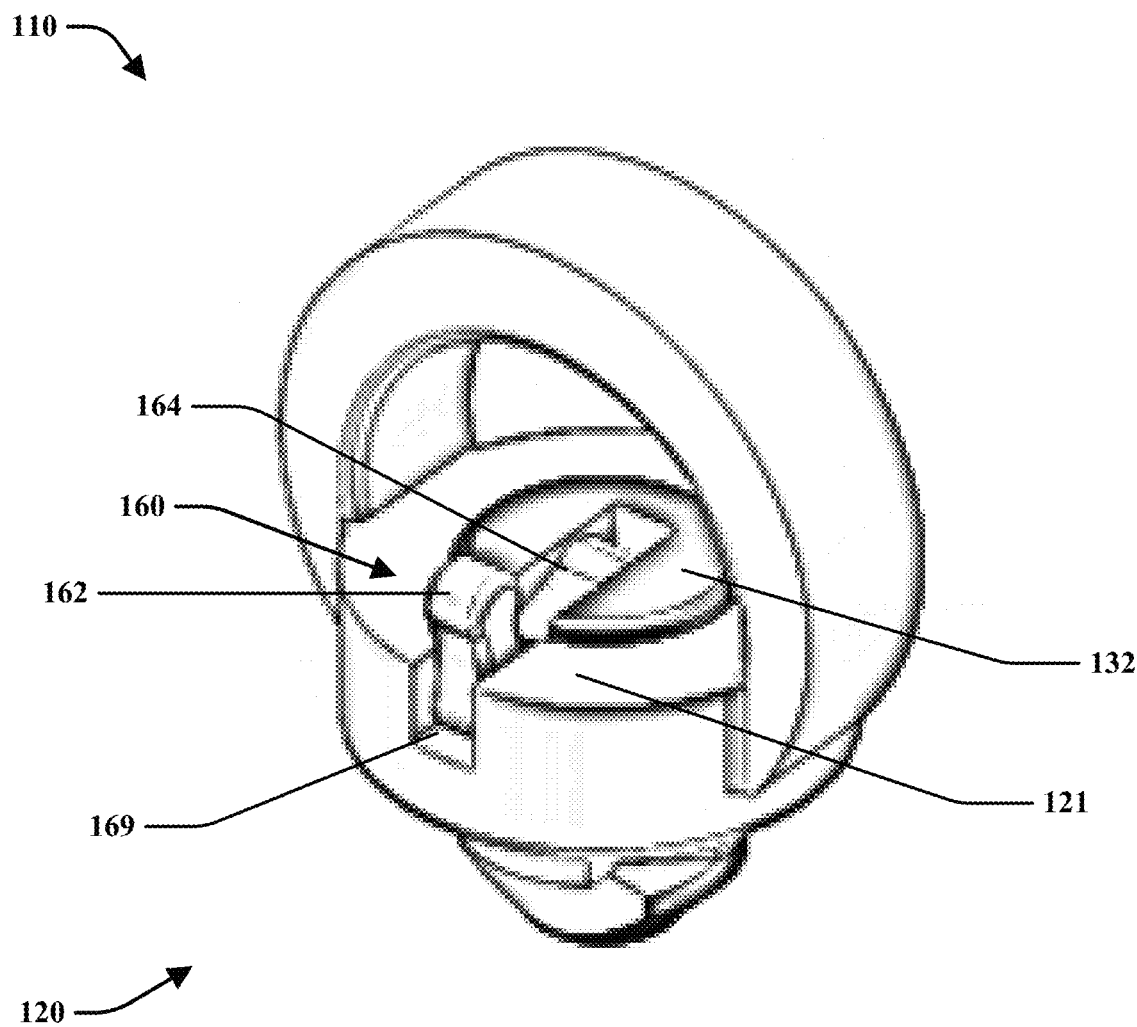
FIG. 6 is a perspective view of an embodiment of the safety chain tie down assembly of the instant application incorporating a securing lever.
Figure 6:
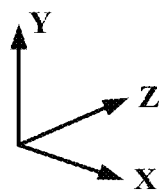

In another embodiment shown in FIG. 6, the safety chain tie down member 110 may further include a securing lever 160. When the safety chain tie down member 110 is rotated into the locked position 142, the pin member 130 is rotated to engage with the receiving members 40. The securing lever 160 may be captured in an engaging portion 169 to prevent the pin member 130 of the safety chain tie down member 110 from unintentionally rotating relative to the body member 120 and ultimately from being removed from the receiving member 40.

The securing lever 160 may allow a user to selectively position the safety chain tie down member 110 between a lever engaged position 146 (FIG. 7B) and disengaged position 148 (FIG. 7A). The securing lever 160 may include a lever handle 162 and a lever body 164 laterally disposed from the lever handle 162. The lever handle 162 may be shaped and sized to assist a user with gripping and engaging the handle with a user's hands or fingers. The lever body 164 may be of any appropriate shape. The securing lever 160 may be attached to the top portion 132 of the pin member 130 by a hinge or linkage member 166 located at the top body portion 122 of the body member 120.

The body member 120 may further include the engaging portion 169. The engaging portion 169 may be of any appropriate shape and size and is not limited to that shown. The securing lever 160 may be biased or toggled to engage the engaging portion 169 in the engaged or locked position 146 and may be biased or toggled to disengage the engaging portion 169 in the disengaged or unlocked positon 148. The engaging portion 169 may be generally complementary relative to the shape of the securing lever 160 wherein the securing lever 160 is snuggly inserted or friction fit within the engaging portion 169. In various embodiments, the engaging portion 169 may include a generally cooperating square or rectangular shape that cooperates to form a male-female connection between the engaging portion 169 and securing lever 160. Alternatively or in addition, the securing lever 160 and engaging portion 169 may further include a generally curved shape.

The securing lever 160 may further include a linkage member 166. The linkage member 166 may be a hinge to permit the securing lever 160 to be operatively attached to the body 122. The present teachings, however, are not limited to a particular securing lever 160 or mechanism and any appropriate securing mechanism may be used without departing from the present teachings.

As shown in FIGS. 7A and 7B, the safety chain tie down member 110 may be configured to engage the safety chain tie down member 110 with the receiving members 40 in a secured configuration 149, i.e. with the body member 120 and the pin member 130, and the receiving members 40 in the locked 142 and the engaged 146 positions.

After inserting the pin member 130 into the receiving members 40, the plunging portion 136 may be unlocked or otherwise pivoted toward the locked position 142. The engagement of the plunging portion 136 with the receiving members 40 may cause the safety chain tie down member 110 to be in locked position 142. As previously noted, in this locked position 142, the securing lever 160 may be capable of rotating or pivoting relative to the receiving members 40. An operator may then selectively rotate the securing lever 160 around an axis, for example the X-axis, toward the engaging portion 169 such that the securing lever 160 may be positioned within the engaging portion 169. This then may place the safety chain tie down member 110 in the secured configuration 149, i.e. with the body member 120 and the pin member 130, and the receiving members 40 in the engaged 146 and locked 142 positions.

What has been described above includes examples of the present teachings. It is, of course, not possible to describe every conceivable combination of components or methodologies for purposes of describing the present teachings, but one of ordinary skill in the art may recognize that many further combinations and permutations of the present teachings are possible. Furthermore, it is noted that the various embodiments may be altered, combined, or arranged in any desired configuration. For instance, different locking members or components thereof may be combined and utilized in different combinations than illustrated. Accordingly, the present teachings are intended to embrace all such alterations, modifications and variations that fall within the spirit and scope of the appended claims. To the extent that the term "includes" is used in either the detailed description or the claims, such term is intended to be inclusive in a manner similar to the term "comprising" as "comprising" is interpreted when employed as a transitional word in a claim.

What is claimed is:

1. A safety chain tie down assembly, comprising:
   a body member comprising a body, a handle, and an anti-rotation member extending from the body member;
   a pin member engageable with the body member, the pin member including a plunging portion configured to engage with a receiver of an under bed hitch mounting device;
   wherein pivot motion of the plunging portion positions the pin member between an unlocked position and a locked position; and
   a securing member including a lever attached to the pin member wherein actuation of the securing member positions the lever into engagement with the body member in a secured configuration.

2. The safety chain tie down assembly of claim 1, wherein the securing member further comprises a linkage member attached to the lever.

3. The safety chain tie down assembly of claim 1, wherein the body member further comprises a receiving portion positioned within the body, wherein the receiving portion includes a perimeter wall and a bottom floor.

4. The safety chain tie down assembly of claim 3, further comprising a body opening positioned along the bottom floor wherein the body opening has a complimentary shape to the shape of the plunging portion of the pin member.

5. The safety chain tie down assembly of claim 4, wherein the perimeter wall and bottom floor have a generally complementary shape to a shape of a top portion of the pin member such that the body member is configured to receive the top portion of the pin member and the top portion is rotatable relative to the body of the body member.

6. The safety chain tie down assembly of claim 4, wherein the perimeter wall includes a generally circular configuration to allow a perimeter wall of the top portion of the pin member to rotate when received within the receiving portion of the body.

7. The safety chain tie down assembly of claim 4, wherein the top portion of the pin member includes a bottom surface configured to abut against the bottom floor of the body member to allow the pin member to be received and rotate within the body member.

8. A safety chain tie down assembly, comprising:
   a body member including a body, a handle shaped to define a chain receiving space with the body and an anti-rotation member extending from the body opposite from the handle;
   a pin member engageable with the body member, the pin member including a top portion, an elongated portion and a plunging portion wherein the plunging portion is configured to engage with a receiver of an under bed hitch mounting device; and
   wherein the plunging portion is configured to pivot relative to the body member to position the pin member between an unlocked position and a locked position.

9. The safety chain tie down assembly of claim 8 further comprising a securing member including a lever attached to the pin member wherein actuation of the securing member positions the lever into engagement with the body member in a secured configuration.

10. The safety chain tie down assembly of claim 9, wherein the securing member further comprises a linkage member attached to the lever.

11. The safety chain tie down assembly of claim 8, wherein the body member further comprises a receiving portion positioned within the body, wherein the receiving portion includes a perimeter wall and a bottom floor.

12. The safety chain tie down assembly of claim 11, further comprising a body opening positioned along the bottom floor wherein the body opening has a complimentary shape to the shape of the plunging portion of the pin member.

13. The safety chain tie down assembly of claim 11, wherein the perimeter wall and bottom floor have a generally complementary shape to a shape of the top portion of the pin member such that the body member is configured to receive the top portion of the pin member and the top portion is rotatable relative to the body of the body member.

14. The safety chain tie down assembly of claim 11, wherein the perimeter wall includes a generally circular configuration to allow a perimeter wall of the top portion of the pin member to rotate when received within the receiving portion of the body.

15. The safety chain tie down assembly of claim 11, wherein the top portion of the pin member includes a bottom surface configured to abut against the bottom floor of the body member to allow the pin member to be received and rotate within the body member.

16. A safety chain tie down assembly, comprising:
   a body member including a body, a handle shaped to define a chain receiving space with the body and an anti-rotation member extending from the body opposite from the handle;
   a receiving portion positioned within the body, wherein the receiving portion includes a perimeter wall and a bottom floor;
   a body opening positioned along the bottom floor;
   a pin member engageable with the body member, the pin member including a top portion, an elongated portion and a plunging portion wherein the plunging portion is configured to engage with a receiver of an under bed hitch mounting device; and wherein the body opening has a complimentary shape to the shape of a plunging portion of the pin member; and wherein the plunging portion is configured to pivot relative to the body member to position the pin member between an unlocked position and a locked position.

17. The safety chain tie down assembly of claim 16, further comprising a securing member including a lever attached to the pin member wherein actuation of the securing member positions the lever into engagement with the body member in a secured configuration.

18. The safety chain tie down assembly of claim 17, wherein the securing member further comprises a linkage member attached to the lever.

19. The safety chain tie down assembly of claim 18, wherein the securing lever includes a lever handle and a lever body laterally disposed from the lever handle, wherein the securing lever is attached to the top portion of the pin member by a linkage member located at the top body portion of the body member; and the body member includes an engaging portion such that the securing lever is configured to be biased to engage the engaging portion in an engaged position to prevent rotation of the pin member relative to the body member and to disengage the securing lever from the engaged portion in a disengaged position to allow rotation of the pin member relative to the body member.

* * * * *